United States Patent [19]
Oberle et al.

[11] Patent Number: 5,389,964
[45] Date of Patent: Feb. 14, 1995

[54] BROADCAST CHANNEL SUBSTITUTION METHOD AND APPARATUS

[75] Inventors: Frank X. Oberle, Buffalo Grove; Jody L. Holzman, Highland Park; Terry Renfro, Chicago, all of Ill.

[73] Assignee: Information Resources, Inc., Chicago, Ill.

[21] Appl. No.: 998,494

[22] Filed: Dec. 30, 1992

[51] Int. Cl.6 .................................................. H04N 7/16
[52] U.S. Cl. ................................................ 348/9; 455/6.1
[58] Field of Search ................ 358/86, 84; 455/2, 4.2, 455/5.1, 6.1, 6.2; H04N 7/173, 7/16; 348/6, 9, 10, 11, 12, 460

[56] References Cited

U.S. PATENT DOCUMENTS

| | | |
|---|---|---|
| Re. 33,808 | 1/1992 | Wright, Jr. . |
| 3,312,900 | 4/1967 | Jaffe ........................ 325/31 |
| 3,366,731 | 1/1968 | Wallerstein . |
| 3,639,686 | 2/1972 | Walker et al. ............ 178/5.8 R |
| 3,714,575 | 1/1973 | Rogalski . |
| 3,789,131 | 1/1974 | Harney . |
| 3,864,636 | 2/1975 | Fukuda et al. .............. 325/421 |
| 3,899,633 | 7/1975 | Sorenson et al. . |
| 3,934,079 | 1/1976 | Barnhart . |
| 3,935,534 | 1/1976 | Lewis et al. . |
| 3,975,583 | 8/1976 | Meadows .................... 358/142 |
| 3,997,718 | 12/1976 | Ricketts et al. . |
| 4,020,419 | 4/1977 | Caspari et al. ............. 325/421 |
| 4,035,838 | 7/1977 | Bassani et al. . |
| 4,044,376 | 8/1977 | Porter ......................... 358/84 |
| 4,058,829 | 11/1977 | Thompson .................. 358/84 |
| 4,216,497 | 8/1980 | Ishman et al. ............... 358/84 |
| 4,270,212 | 5/1981 | Furukawa ................... 455/3 |
| 4,272,729 | 6/1981 | Riley, Jr. . |
| 4,329,675 | 5/1982 | Van Hulle ................... 358/86 |
| 4,331,973 | 5/1982 | Eskin et al. ................. 358/84 |
| 4,331,974 | 5/1982 | Cogswell .................... 358/84 |
| 4,425,578 | 1/1984 | Haselwood et al. ......... 358/84 |
| 4,577,220 | 3/1986 | Laxton et al. ............... 358/84 |
| 4,622,583 | 11/1986 | Watanabe et al. ........... 358/84 |
| 4,630,108 | 12/1986 | Gomersall ................... 358/84 |
| 4,633,315 | 12/1986 | Kasperkovitz .............. 358/188 |
| 4,723,302 | 2/1988 | Fulmer et al. ............... 455/2 |
| 4,733,301 | 3/1988 | Wright, Jr. . |
| 4,736,390 | 4/1988 | Ward et al. ................. 375/75 |
| 4,783,843 | 11/1988 | Leff et al. ................... 455/22 |
| 4,789,897 | 12/1988 | Kappeler et al. ............ 358/188 |
| 4,847,685 | 7/1989 | Gall et al. ................... 358/84 |
| 4,876,736 | 10/1989 | Kiewit ........................ 455/2 |
| 4,878,245 | 10/1989 | Bradley et al. .............. 380/10 |
| 4,885,632 | 12/1989 | Mabey et al. ............... 358/84 |
| 4,929,905 | 5/1990 | Ruitenburg ................. 329/358 |
| 4,972,504 | 11/1990 | Daniel, Jr. et al. . |
| 4,974,085 | 11/1990 | Campbell .................... 358/85 |
| 5,055,924 | 10/1991 | Skuha ......................... 358/84 |
| 5,155,591 | 10/1992 | Wachob ...................... 455/6.2 |
| 5,231,494 | 7/1993 | Wachob ...................... 455/6.1 |

FOREIGN PATENT DOCUMENTS

| | | | |
|---|---|---|---|
| 0247140 | 11/1986 | Japan ................... | 358/86 |
| 2052196 | 1/1981 | United Kingdom ..... | H03D 1/22 |

*Primary Examiner*—Victor R. Kostak
*Assistant Examiner*—Chris Grant
*Attorney, Agent, or Firm*—Fitch, Even, Tabin & Flannery

[57] ABSTRACT

Each of a plurality of households includes a channel substitution unit which receives a normal spectrum of television channel signals and at least one substitute channel signal. The substitution unit of each household, upon command from a control arrangement, replaces a channel of the normal television channel spectrum with the substitute channel and distributes the resulting spectrum, comprising the original normal spectrum of television channel signals with one substituted channel, over a distribution medium such as an in-house distribution cable.

24 Claims, 5 Drawing Sheets

| | | | |
|---|---|---|---|
| 5A | /2/3/4/ ••• | /58/59/60/ ••• |
| 5B | /2/3/X/ ••• | /58/59/60/ ••• |
| 5C | /X/X/59/ ••• | /X/X/X/ ••• |
| 5D | /2/3/59/ ••• | /58/59/60/ ••• |

BROADCAST CHANNEL SUBSTITUTION METHOD AND APPARATUS

BACKGROUND OF THE INVENTION

The present invention relates to television distribution systems and, more particularly, to television signal distribution methods and apparatus for substituting one television channel for another at a viewer premises.

Marketing research techniques have been developed in which a substitute television signal in a substitute channel containing a commercial, the effectiveness of which is to be assessed, is substituted for a normal television signal in homes of selected test viewers, so that the effectiveness of the commercial can be evaluated. This allows the promotor of the service or product to assess the reaction of a small, demographically controlled panel of test viewers before the wide airing of a commercial which may prove ineffective.

Signal substitution systems have been developed which provide marketing research signal substitution for the testing of commercials. Such systems employ a frequency converter in the nature of a cable television (CATV) converter which frequency converts selected channels to a base frequency, such as channel 3. All television receivers connected to the frequency converter are then tuned to channel 3 and receive the same programming selected by the converter. One example of such a system is disclosed in U.S. Pat. No. 4,733,301 issued Mar. 22, 1988 to Wright. The Wright system includes a frequency converter control box which receives both normal and substitute signals in frequency separated channels. During periods of non-substitution, the control box converts a normal television signal of a viewer's choosing to the frequency of channel 3 and applies the resultant channel 3 signals to TV receivers tuned to channel 3. The viewer changes channels by controlling the control box to present other television signals on channel 3.

When marketing research channel substitution is to occur, the viewer channel selection is overridden without viewer knowledge and a selected substitute channel is converted to channel 3 by the frequency converter. The result of this type of channel substitution is that the frequency converter control box selects the only TV signal, be it normal or substitute, which is applied to all television receivers connected to the output of the converter. When viewers wish to watch different channels from those being watched on other television receivers of the system, separate frequency converter boxes are required for each television. Although many televisions are being produced which are capable of receiving CATV signals directly without the need for a cable converter box, such a converter box is necessary for all television receivers to which channel substitution may be applied.

Prior channel substitution arrangements have a number of drawbacks. For example, each television in a test viewer's household must have a convertor box with capability of viewer channel selection and market research channel substitution. Such convertors are generally provided by the market research company, which then becomes responsible for maintaining all the convertor boxes in test viewer households. Since the marketing research company has no control over cable television parameters such as the channels available and their frequency assignments, the market research company must keep in close contact with multiple cable television distributors and change the convertor boxes whenever needed for cable television system compatibility.

Today's television receivers are capable of directly receiving cable television signals without the use of convertors. This situation introduces further problems. Many owners of such televisions would prefer to operate without a signal convertor so that they may take advantage of the capabilities of their television, such as picture-in-picture. This leads to test viewer resistance and, at times, results in test viewer households in which not all televisions are capable of receiving substituted channels. For best marketing research results, however, it is desirable to have all televisions in a test viewer household to be subject to channel substitution.

A need exists for viewer premises equipment which simply and conveniently provides controlled television signal substitution without the need for a per-television convertor and otherwise leaves viewer channel selection to the viewer and/or the viewer's cable television distribution company.

SUMMARY OF THE INVENTION

A viewer premises channel substitution arrangement in accordance with the present invention includes a channel substitution unit which receives a television signal spectrum comprising a plurality of normal television signals in frequency separated channels and at least one substitute channel. The channel substitution unit responds to control signals by replacing a normal channel specified in the control signal with information from the substitute channel and distributes the modified spectrum, comprising normal channels and the substitute channel information, on a distribution path in the viewer premises. Each television receiver connected to the distribution path of the viewer premises receives the full spectrum of television signals when substitution is not enabled, and, when substitution is enabled, each receiver receives the full spectrum of normal channels into which the substitute signal is conveyed in one channel. Since each receiver receives all incoming normal channels, no per-television receiver converter boxes are needed and the various capabilities of the receiver can be exploited. Advantageously, the channel substitution unit can be connected to an incoming cable television line at a point which limits the viewer's access to a non-substituted spectrum, thereby improving marketing research results.

In an embodiment of the present invention, a viewer premises receives an incoming cable television signal spectrum, including at least one substitute signal and a complement of normal television channels. A channel substitution unit distributes the full spectrum of received channels to television receivers in the viewer premises over a distribution path, such as a standard 75 ohm coaxial cable. Thus, any receiver of the viewer's premises connected to the coaxial cable can receive any of the cable channels. With this capability special receiver functions, such as picture-in-picture, are usable. When substitute programming is to replace normal programming on, for example, channel 4, any receiver at the viewer premises tuned to channel 4 will receive the substitute programming, and any receiver tuned to another channel will receive the normal programming on that channel. Additionally, each substitution unit is assigned an address which is used to identify which of multiple control signals are to be responded to. By properly associating addresses with transmitted control signals, any subset of subscriber units and thus, any subset of viewer premises, can be controlled to substitute channels, while other viewer premises will not be so controlled and will receive only normal programming.

A channel substitution unit of the embodiment receives a spectrum of normal television signals in frequency separated channels and at least one substitute television signal. The channel substitution unit receives control signals specifying a normal channel into which the substitute signal is to be placed. Upon address matching, the channel substitution unit responds to the control signals by deleting the specified normal channel from the received spectrum and converting the received substitute signal into a channel of the same frequency as the deleted normal channel. After deletion of the specified normal channel, the remaining spectrum of normal channels is combined with the frequency converted substitute signal and the combined spectrum is distributed to television receivers within the viewer premises.

The plurality of normal television signals and the substitute signal may all be received in frequency separated channels of a cable television distribution cable. When signals are received in this manner, they are split into a first and second substantially identical representation of the same received spectrum. A normal channel specified for replacement is deleted from the first spectrum representation, and the substitute channel is selected from the second representation, for example, with a television tuner, and is frequency converted to the frequency of the deleted channel. The two resulting representations are then combined into a single spectrum which is distributed within the viewer premises.

Advantageously, the normal channel is deleted from the first representation by frequency converting the entire spectrum of the first representation, so that the channel to be deleted is centered at a predetermined frequency. The frequency converted first representation is then applied to a band rejection filter having a bandwidth substantially equal to one television channel centered at the predetermined frequency. The second representation, after substitute channel selection, is also frequency converted to center the selected substitute channel at the same predetermined frequency that was deleted from the first representation. The signals resulting from the first and second representations are then combined and frequency converted back to standard television distribution frequencies.

The present channel substitution system may also be employed with viewer premises in which the television signal spectrum is received by means other than cable, such as broadcast transmission and antenna reception. When the substitute channel is received in the same broadcast spectrum as the normal channels, substitution is performed using first and second spectrum representation as set forth above. Alternatively, when the substitute channel is received as a part of some other spectrum of signals, such as normal channels being transmitted on VHF and substitute channels being transmitted on UHF, there is no need to produce separate representations of the same spectrum. All that is needed is that the substitute channel is appropriately aligned in frequency with the deleted normal channel when the substitute channel is combined with the normal channels.

BRIEF DESCRIPTION OF THE DRAWINGS

FIGS. 5A-D represent the television channel spectrum as modified by the Insert/Delete unit;

DETAILED DESCRIPTION OF THE PREFERRED EMBODIMENT

Figure 1:
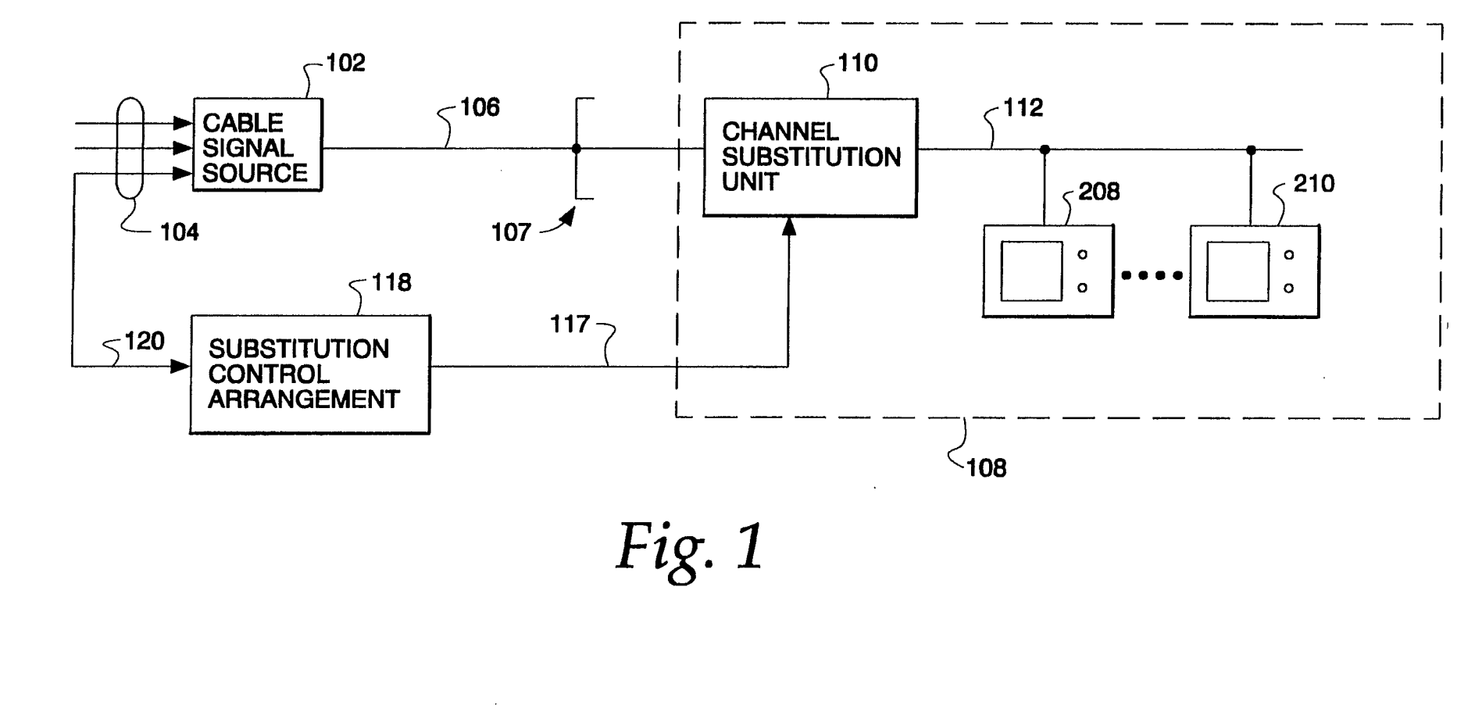
FIG. 1 is a block diagram of a cable television signal distribution system and channel substitution arrangement.

FIG. 1 is a block diagram of a channel substitution system in accordance with the present invention for households connected to a transmission line of a cable television distribution arrangement. As used herein, the term transmission line includes any medium for directing electromagnetic energy along a path, such as coaxial cable, twin lead, optical fiber or waveguide. Systems using other types of signal distribution such as RF broadcasting also gain advantages from the present invention, as is discussed later herein. FIG. 1 includes a cable television signal source 102 which receives television programming from a plurality of sources 104 and combines the received programming into 6 MHz channels on an outgoing communication path 106. The functions performed by cable signal source 102 are substantially those performed by a cable television distributor.

In the present example, the RF spectrum on communication path 106 is frequency separated into a plurality of 6 MHz channels compatible with the transmission and reception of cable television signals. In the present embodiment, the lowest channel begins at approximately 50 MHz and the highest channel ends at approximately 650 MHz. The channels of the television signal spectrum on path 106 are represented in FIG. 5A as a continuous sequence of channels separated by vertical lines. It is well known that the numerical sequence of channels is not monotonically and contiguously assigned 6 MHz portions of the available spectrum. For ease of understanding the present invention, however, the channels are represented in FIGS. 5A-5D as being in direct numerical sequence and contiguous with one another. The signals on communication path 106 are coupled by distribution apparatus 107 to a plurality of viewer premises such as viewer premises 108. Such a viewer premise may be, for example, a business or a household.

The present embodiment provides methods and apparatus for substituting at least one channel on communication path 106 for another such channel on a per-viewer premises basis and for conveying the television signal spectrum including such substituted channel to multiple receivers 208 and 210 on the premises. The actual channel substitution is provided by channel substitution unit 110, which receives the television signal spectrum on path 106 and produces on a communication path 112 an outgoing signal spectrum in which the information carried in at least one selected channel can be replaced with the information carried in another selected channel. For best test market research, channel substitution unit 110 is connected to the viewer premises cable television cable at a point very near the introduction of the cable into the premises. This limits the viewer's ability to bypass the substitution unit 110 and receive cable television signals which have not been subject to its substitution capability. FIGS. 5A-5D represent such substitution by showing the signal spectrum (FIG. 5A) arriving at the channel substitution unit 110 on path 106, and a sequence of channels (FIG. 5D) as they leave channel substitution unit 110 on communication path 112 after substitution of channel 59 for channel 4. The signals on communication path 112 are distributed to television receivers 208 and 210 within the viewer premise. FIG. 5D clearly shows that any television receiver 208 and 210 can receive a full spectrum of channels and that substitution has occurred.

The overall intelligence for controlling the system of FIG. 1 is exercised at a substitution control arrangement 118 which may be managed, for example, by a marketing research company which contracts for channel substitution with product manufacturers or suppliers of advertisements, in order to evaluate advertisements. In accordance with such a contract, substitution control arrangement 118 provides, on a communication path 120, the substitute program content to be substituted for a "normal" channel and instructions which identify to the cable signal source 102, the channel on path 106 to be used to convey the new substitute programming to viewers' premises, the particular viewer premises which are to implement the substitution, and the identity of the specific channel into which the substitute programming is to be inserted. The cable signal source 102 then provides the substitute programming in the substitute channel, e.g. 59, on communication path 106 to the viewer premises equipment at the appropriate times and notifies the specified channel substitution units 110 of the channel conveying the substitute programming and the channel into which the substitute programming is to be substituted. Such notification is transmitted on a predetermined channel on communication path 106, which may also be used for programming.

The following example illustrates the business and technical interrelationships of a situation where the XYZ Company plans to run an advertisement at approximately 8:15 P.M. on a predetermined channel, e.g., channel 4, but wants 50% of a group of viewers to see a substitute advertisement instead. XYZ Company contracts with the marketing research company in control of the arrangement 118 and provides them with the necessary details and the substitute advertisement. The substitute advertisement and specifications identifying the 50 percent of viewers to see the substitute, as well as the date and time of substitution, are then provided to the cable signal source 102 over communication path 120. The specified channel substitution units 110 are notified via cable 106 of the identity of the substitute source and destination channels as well as the time for substitution. At the appropriate time, the substitute advertisement is sent from substitution control arrangement 118 and cable signal source 102 in a substitute source channel, e.g., 59, on communication path 106. The channel substitution units 110 in all addressed viewer premises will automatically perform the substitution to present the substitute advertisement (channel 59) to the specified premises in channel 4 of the spectrum on communication path 112.

In order to reduce the time-critical nature of the above substitution, the substitution control arrangement 118 and cable signal source 102 may present the normal channel 4 programming on both the substitute channel 59 and the destination channel 4 and may add the substitute advertisement to the normal program conveyed in the substitute channel 59 at the appropriate time. Since the normal channel programming is being conveyed in both the substitute channel 59 and the normal channel 4, the individual channel substitution units 110 may be controlled to begin substitution before the substitute advertisement is actually presented. In this way, all specified channel substitution units 110 need not be simultaneously controlled at the beginning of the substitute advertisement. When channel substitution is implemented by presenting normal programming in both the normal and substitute channels there is also no need to inform the cable signal source 102 of the exact time for substitution.

Figure 2:
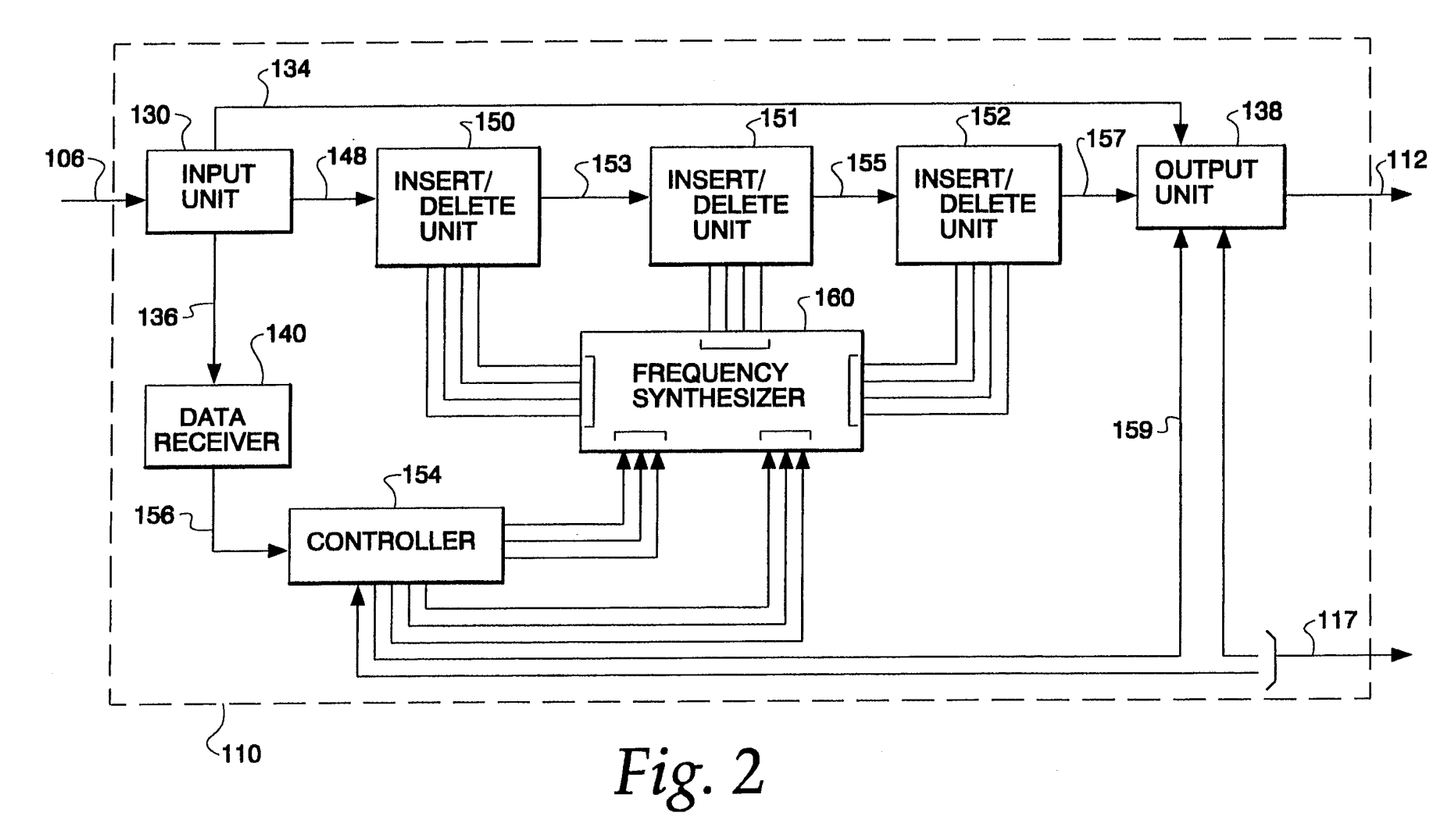
FIG. 2 is a block diagram of a channel substitution unit for use in the distribution system of FIG. 1.
Figure 3:
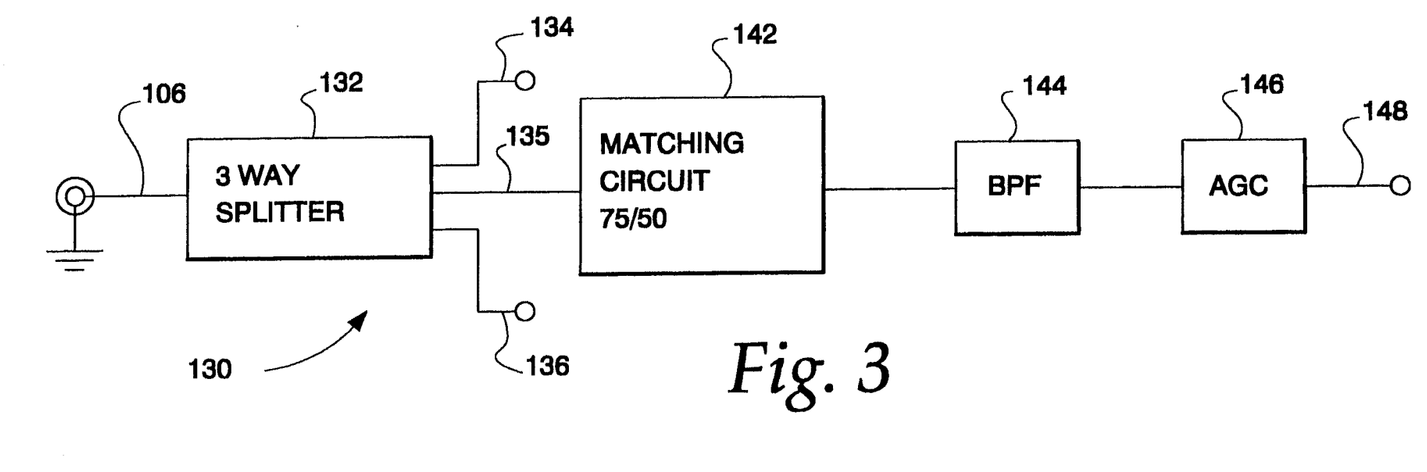
FIG. 3 is a block diagram of an input unit of the channel substitution unit.

FIG. 2 is a block diagram of the channel substitution unit 110 which receives the approximately 600 MHz, channel-bearing signal spectrum from the cable signal source 102 on communication path 106 at an input unit 130. Communication path 106 is a standard 75 ohm coaxial cable which is connected within input unit 130 to a 3-way signal splitter 132 (FIG. 3). Output conductors 134 and 136 of 3-way splitter 132 convey the full spectrum received on path 106 to an output unit 138 and a control data receiver 140, respectively. The third output conductor 135 of 3-way splitter 132 is the main signal path which conveys the full received spectrum to an output conductor 148 via an impedance-matching circuit 142, having a 50 ohm characteristic output impedance, a bandpass filter 144 having a pass band substantially equal to the approximately 50 MHz to 650 MHz signal spectrum and an automatic gain control circuit 146 for producing a signal on communication path 148 of a predetermined amplitude. Conductor 148 is connected as an input to a first of three serially connected insert/delete units 150, 151 and 152. Each insert/delete unit implements channel substitution for one substitution source channel and one substitution destination channel. Three insert/delete units 150, 151, and 152, are shown and described herein; however, any number of such units could be provided, depending on the number of simultaneously substituted channels desired and practical levels of possible signal degradation.

All three of the insert/delete units 150, 151 and 152 operate under the control of a microprocessor controller 154, functioning in response to a stored program and control data received from cable signal source 102 by data receiver 140. Data receiver 140 is connected by communication path 136 from input unit 130. In the present embodiment, control information, such as the identities of substitution source and destination channels, is conveyed in a 3 MHz band just below the television's channel spectrum on cable 106. Alternatively, the control information could be conveyed in a "hidden" mode on one or more of the television channels as is well known in the art. Data receiver 140 detects such control information, digitizes it and forwards it on to controller 154 via a communication path 156. Each of the channel substitution units 110 of a distribution system is assigned a unique address, different from the address of all other channel substitution units. Each control message transmitted by cable signal source 102 includes an address portion which identifies the particular destination address for the message. When a message is received and forwarded by data receiver 140, controller 154 decodes the address portion to determine if it is a proper recipient of the message. Controller 154 ignores any message not properly addressed to it. Alternatively, when controller 154 is a proper recipient, a control data portion of the message is decoded and acted upon. Such actions include sending control signals at appropriate times to the insert/delete units 150, 151 and 152 via a frequency synthesizer 160.

Figure 4:
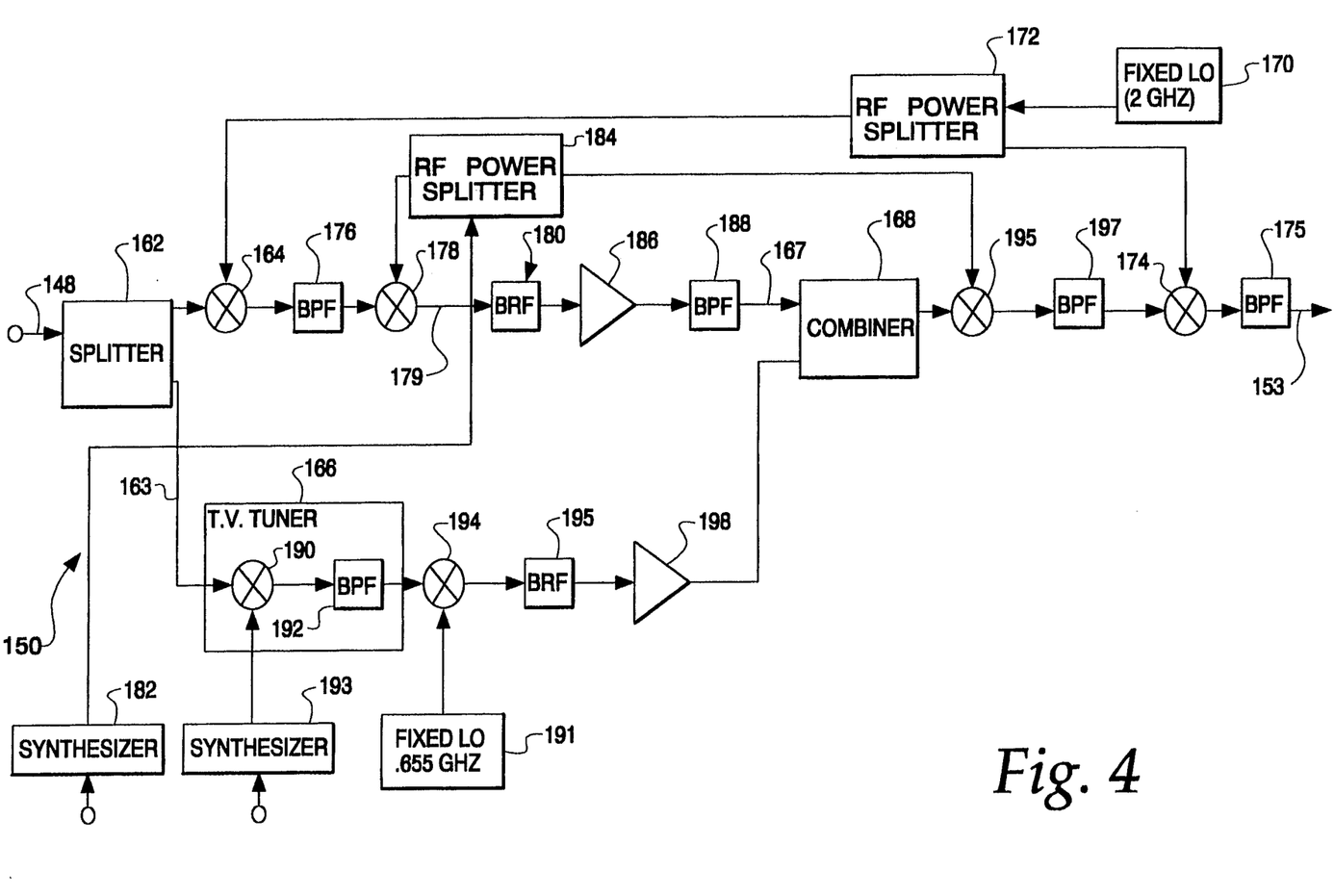
FIG. 4 is a block diagram of an Insert/Delete unit of the channel substitution unit.

FIG. 4 is a block diagram of insert/delete unit 150, which also represents substantially identical insert/delete units 151 and 152. Insert/delete unit 150 receives the spectrum of television channels on communication path 148 in a frequency band from approximately 50 MHz–650 MHz. The received signal is split into two substantially equal spectrum representations by a signal splitter 162 which conveys the signal representations to a mixer 164, and to a TV tuner 166. For reasons which will become apparent, the signal applied to mixer 164 and the signal path shown traveling left to right from mixer 164 to a signal combiner 168, is referred to as the "normal signal path" and the signal applied to tuner 166 and the signal path from tuner 166 to the signal combiner 168, is referred to as the "substitute source signal path." FIGS. 5A–5D represent a relevant portion of the spectrum of TV channels passing through the normal and substitute paths. The absolute frequency of the channels varies at different points within the circuitry, but the channel boundaries as represented by the vertical lines in FIGS. 5A–5D, are carefully aligned at combiner 168 where actual substitution occurs.

FIG. 5A shows the television channel assignment of signals applied by splitter 162 to the normal signal path and the substitute signal path. The normal path is used to delete the channel into which the substitute programming is to be inserted. FIG. 5B shows the normal signal as applied by communication path 167 to the signal combiner 168. In FIG. 5B, channel 4 has been removed as is represented by the "X" in its assigned bandwidth. FIG. 5C shows the operation of the apparatus in the substitute path, which apparatus deletes all of the received spectrum except the substitute channel, e.g., 59. The signals represented in FIGS. 5B and 5C are combined by operation of combiner 168 into a signal 5D in which channel 59 has been substituted into the channel formerly occupied by channel 4. The particular channel deleted from the normal path and the particular channel passed on the substitute source path are specified by the controller 154, in accordance with the received data messages.

The particular channels deleted and substituted therefore are controlled by local oscillator signals specified by controller 154 and generated by frequency synthesizer circuit 160. The frequency generators 170, 182,193 and 191 which are shown in FIG. 4 are actually parts of synthesizer unit 160. Insert/delete unit 150 receives a 2 GHz local oscillator (LO) signal from a fixed frequency oscillator 170. The 2 GHz LO signal is split into two by an RF power splitter 172 and applied to mixer 164 and to an output mixer 174. Mixer 164 operates on the heterodyne principle and beats the 2 GHz LO signal with the 50 MHz–650 MHz TV spectrum from splitter 162. The output of mixer 164 is filtered by a bandpass filter 176 having a center frequency of 2.35 GHz and a bandwidth of 600 MHz, to pass the entire 600 MHz TV signal band in a range between 2.05 and 2.65 GHz to a mixer 178. The output of a frequency synthesizer 182, which is coupled to mixer 178 via an RF power splitter 184, is used to center a channel to be deleted at 700 MHz. In order to center any of the incoming channels at 700 MHz, frequency synthesizer 182, under control of controller 154, produces a frequency in the range of 1.35 to 1.95 GHz as specified by controller 154. Frequency synthesizer 182 is constructed as a phase-locked loop in a manner well known in the art and control over its frequency by controller 154 is exercised by transmitting an appropriate feedback divisor value to the frequency synthesizer. The operation of frequency synthesizers under digital control is well known in the art and not described in detail herein.

The output signals from mixer 178 are connected to a steep-sided band rejection filter 180, having a center frequency of 700 MHz and a bandwidth substantially equal to the 6 MHz television bandwidth. Band rejection filter 180 substantially removes the channel centered by the operation of mixer 178 at 700 MHz, as is represented in FIG. 5B, where channel 4 is the deleted channel. The normal television signals from band rejection filter 180 are then amplified by an amplifier 186 to achieve a predetermined level, and applied as an input to combiner 168 via bandpass filter 188 having a center frequency of 700 MHz and a bandwidth of 1.2 GHz.

Figure 8:
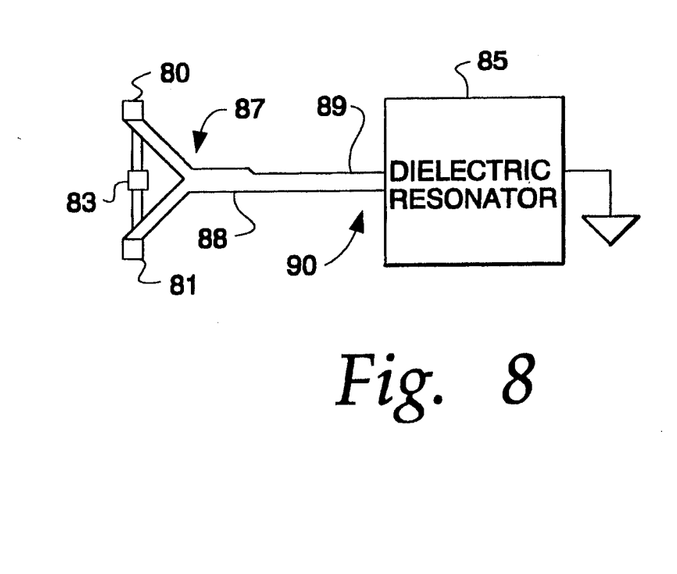
FIG. 8 shows a band rejection filter for use in the Insert/Delete unit of FIG. 4.

It is desirable to alter the normal television signal spectrum as little as possible by the channel deletion operation. Preferably, band rejection filter 180 substantially deletes only one channel e.g., channel 4, without significantly affecting the adjacent channels e.g., channels 3 and 5. One such filter is shown in FIG. 8 and comprises an input port 80 and an output port 81 connected by a 50 ohm impedance 83. A dielectric resonator block 85 such as the TRANSTECH Model SR8800SPQ1200BY is coupled between ground and a common node 87 of input port 80 and output port 81 by a power splitter 88, a ¼ wave transmission line 89 and a coupling capacitance at 90. The bandwidth, frequency and rejection notch depth can be established by adjusting the transmission line 89 length, the value of the coupling a capacitance 90 and the resonant frequency of the dielectric resonator block 85 as is well known in the art.

The substitute path 163 from splitter 162 is used to select and properly align one specified substitute channel, e.g., 59, from the incoming television channels. Accordingly, the substitute representation from splitter 162 need not represent the entire spectrum but only a portion of the received spectrum which includes the substitute channel e.g., channel 59. The substitute path includes a television tuner 166 having a mixer 190 and a 6 MHz bandpass filter 192 centered at 45 MHz. By controlling a frequency synthesizer 193, controller 154 causes the tuner 166 to select a particular channel such as channel 59, and to delete the remainder of the channels appearing at the input of the tuner. This is depicted in FIG. 5C. The output signals from tuner 166 are heterodyned in a mixer 194 with a fixed LO signal of 655 MHz from local oscillator 191, to up-convert the selected substitute channel from 45 MHz to 700 MHz, which is the center frequency of the channel being deleted from the normal path. The output of mixer 194 is filtered in a bandpass filter 196 centered at 700 MHz, amplified to a predetermined level by amplifier 198 and conveyed as a second input to RF signal combiner 168. The substitute signal input to signal combiner 168 is represented in FIG. 5C.

The output signals of signal combiner 168, as represented in FIG. 5D, are applied to the input of a mixer 195 which also receives the same LO signals from RF splitter 184 that are applied to mixer 178. A bandpass filter 197 having a center frequency of 2.350 GHz and a bandwidth of 600 MHz then transfers the 600 MHz television signal spectrum, having the newly substituted channel, to mixer 174 which, by connection to the 2 GHz output of oscillator 170, down converts the channels to their standard transmission frequencies. The output signals of mixer 174 are passed via a bandpass filter 175, having a pass band substantially equal to the approximately 50 MHz to 650 MHz signal spectrum, to a communication path 153.

Output signals from insert/delete unit 150 are transmitted on the communication path 153 to the second insert/delete unit 151 (FIG. 2). Insert/delete unit 151 is substantially identical to insert/delete unit 150 and is capable of providing at its output 155 a television signal spectrum in which a second channel has been substituted. A third substantially identical insert/delete unit 152 receives signals on output 155 and conveys a television signal spectrum to an output unit 138 via a path 157. Three insert/delete units 150, 151, and 152 are employed in the present system, so that three channels can be substituted simultaneously. More or fewer insert/delete units could be used when more or fewer channels are to be simultaneously substituted.

Output unit 138 (FIG. 6) receives signals from insert/delete unit 152 at an automatic gain control circuit 202 which sets a predetermined optimal signal level for distribution within the viewer premises and conveys the level-adjusted signal to a matching circuit 204. The characteristic impedance of the communication path is converted by matching circuit 204 to 75 ohms for cable distribution. An RF double pole, single-throw electronic relay 205 receives output signals from impedance matching circuit 204 and from the input unit 130 on conductor 134, which carries a representation of the input signals from communication path 106. During normal operation, controller 154 sends a signal on a control conductor 159 which controls relay 205 to connect signals from matching circuit 204 to outgoing communication path 206. During power failure and during periods of erroneous operation by the insert/delete units, no such signal is sent to relay 205, which then connects signals from communication path 134 to communication path 206, effectively bypassing the channel substitution unit 110.

Figures 5, 6, 7:
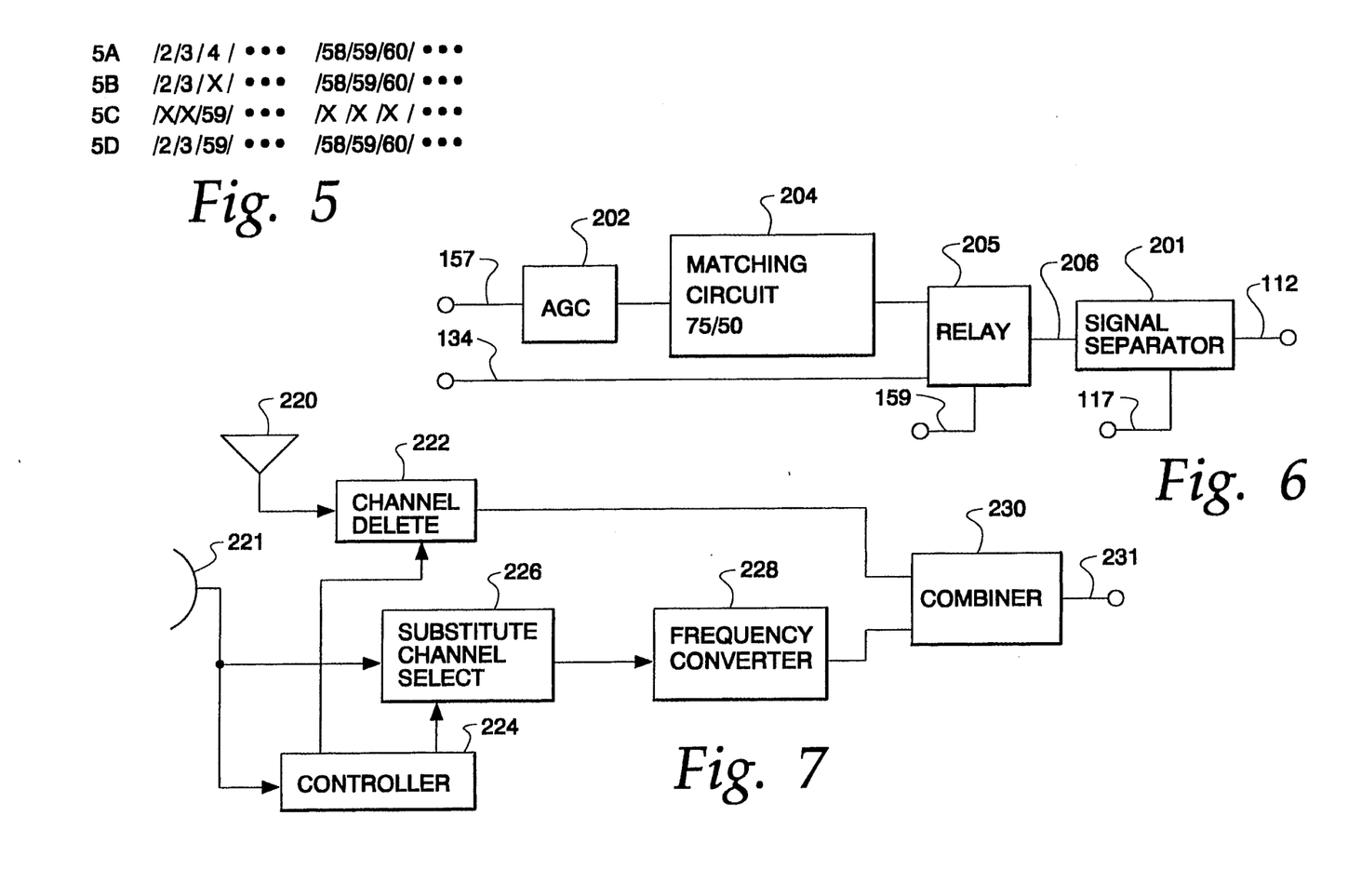
FIG. 6 is a block diagram of an output unit of the channel substitution unit.
FIG. 7 shows an embodiment of the present invention to be used with antenna received television signals.

The signals on communication path 206 are coupled by a signal separator 201 and communication path 112 to the connected television receivers 208 and 210. Thus, receivers 208 and 210 receive the full incoming television spectrum signals, except certain specified substitute channels may have replaced specified normal channels. The signal separator 201 is used to separate from path 112 signals which may be returning from television receivers 208 and 210. For example, television receivers 208 and 210 may send signals on path 112 to indicate which channel is currently being watched at those receivers. Signal separator 201 removes the return signals from the receivers and forwards the return signals to substitution control arrangement 118 via a path 117.

The preceding example describes a channel substitution system with which both the normal channel and the substitute channel are received on the same communication path 106. Although the television spectrum on the path 106 is described as being sent from a cable distribution system 102, it should be clear to those of ordinary skill in the art that the television channel spectrum on path 106 could be produced at the output of an ordinary household type television receiving antenna by means of which the substitute channel or channels is received as a normal television channel and applied to a common communication path.

Additional embodiments of the invention, such as that shown in FIG. 7, may also be constructed in which the substitute channels are not conveyed as part of the same incoming television signal spectrum. In FIG. 7, an antenna 220 receives a plurality of frequency separated normal channels. A separate antenna 221 receives substitute programming channels and control messages. The received control messages, which specify normal channels for deletion and substitute channels therefor are received by an addressable controller 224. When appropriately addressed in a control message, controller 224 decodes the message and controls a channel deletion unit 222 and a substitution channel selection unit 226 by local oscillator synthesis, as in the prior embodiment. Channel deletion unit 222 responds to controller 224 by deleting from the television spectrum from antenna 220 a channel specified in the control message. At the same time, substitution channel unit 226 deletes all received channels from antenna 221, except a substitute channel of programming specified in the data message and selected by controller 224. The output signals of selector 226 comprise a single television channel at a predetermined center frequency which is frequency converted by a frequency convertor 228 to align the substitute channel with the normal channel deleted by channel deletion unit 222 from antenna 220. The modified signals from channel deletion unit 222 and substitute channel selector 226 are combined in an RF-signal combiner 230 to produce a television signal spectrum on a path 231 which may be connected into multiple television receivers and/or other television channel selectors.

While preferred embodiments of the invention have been illustrated, it will be obvious to those skilled in the art that various modifications and changes may be made thereto without departing from the invention as defined in the appended claims.

What is claimed is:

1. A signal substitution system at a viewer premises for substituting television signals in a channel on a distribution means with substitute television signals, said apparatus comprising at said viewer premises:

means for receiving a plurality of television signals and for distributing said received plurality of television signals in a plurality of RF frequency separated channels on said distribution means;

means for receiving control signals directing the substitution of a specified first of said received television signals for the signals in a specified one of said plurality of frequency separated channels on said distribution means;

RF channel deletion apparatus responsive to said received control signals for deleting said specified frequency separated channel from said distribution means;

means for frequency converting said specified first received television signals to the frequency of said specified frequency separated channel; and means for combining said frequency converted first television signals with the signals in the plurality of frequency separated channels on said distribution means.

2. A signal substitution system in accordance with claim 1 wherein said means for receiving a plurality of television signals comprises means for receiving said plurality of television signals in a spectrum of frequency separated channels.

3. A signal substitution system in accordance with claim 2 wherein said RF channel deletion apparatus comprises means for frequency converting the entire spectrum of received television signals by an amount to substantially center said specified frequency separated channel at a predetermined frequency; and band rejection filter means substantially centered at said predetermined frequency for filtering said specified frequency separated channel from said frequency converted spectrum, 4. A signal substitution system in accordance with claim 3 wherein said band rejection filter means has a bandwidth substantially equal to one television channel.

5. A signal substitution system in accordance with claim 3 wherein said means for frequency converting said specified first received television signals comprises means for receiving a representation of at least a portion of said spectrum of frequency separated channels and channel selection means for substantially deleting all of said frequency separated channels of said spectrum representation except said specified first television signals.

6. A signal substitution system in accordance with claim 5 wherein said channel selection means comprises a television tuner for generating output signals conveying said specified first television signals at a predetermined intermediate frequency and means for frequency converting said intermediate frequency to said predetermined frequency.

7. A signal substitution system in accordance with claim 2 wherein said means for receiving control signals comprises means coupled to said received spectrum of frequency separated channels for detecting control signals conveyed by at least one of said frequency separated channels.

8. A signal substitution system in accordance with claim 2 wherein said means for receiving a plurality of television signals comprises means connected to a transmission line from a cable television signal source.

9. A signal substitution system in accordance with claim 2 wherein said means for receiving a plurality of television signals comprises means connected to at least one antenna at said viewer premises.

10. A signal substitution system for substituting television signals at a viewer premises comprising:
an input communication path conveying a television distribution spectrum comprising a plurality of television signals in a plurality of frequency separated channels;
a source of a substitute television signal;
means for receiving control signals specifying one of said plurality of frequency separated channels on said communication path for substitution by said substitute television signal;
means responsive to said control signals and said substitute television signal for modifying said television distribution spectrum on said communication path by deleting said specified frequency separated channel and replacing the one specified deleted frequency separated channel with a channel conveying said substitute television signal having the same frequency as the specified frequency separated channel; and means for conveying said modified television distribution spectrum comprising a plurality of frequency separated channels including the channel conveying said substitute television signal to at least one television receiver.

11. A signal substitution system in accordance with claim 10 wherein said input communication path comprises a transmission line from a cable television signal source.

12. A signal substitution system in accordance with claim 11 wherein said substitute television signal is conveyed in one frequency separated channel on said input communication path and said source of a substitute television signal comprises means for receiving a representation of at least a portion of said television distribution spectrum and means for deleting all of said frequency separated channels from said representation of said television distribution spectrum except the frequency separated channel conveying said substitute television signal.

13. A signal substitution system in accordance with claim 10 wherein said means for modifying comprises:
means for deleting the specified frequency separated channel from said television distribution spectrum;
means for producing a substitute channel conveying said substitute television signal and having the same frequency as said deleted channel; and
means for combining said produced substitute channel with the television distribution spectrum from which the specified television signal has been deleted.

14. A signal substitution system in accordance with claim 13 wherein said means for deleting comprises means for frequency converting the entire spectrum of received television signals to substantially center said specified one of said frequency separated channels at a predetermined frequency; and
band rejection filter means substantially centered at said predetermined frequency for filtering said specified one of said frequency separated channels from said frequency converted spectrum.

15. A signal substitution system in accordance with claim 14 wherein said band rejection filter means has a bandwidth substantially equal to one television channel.

16. A television distribution system comprising:
a communication path for conveying a plurality of normal television signals and at least one substitute television signal in a television signal spectrum of frequency separated channels on said communication path;
means for conveying channel substitution control signals on said communication path, said channel substitution control signals specifying one of said frequency separated channels conveying normal television signals and comprising an address portion;
plurality of individually addressable viewer premises apparatuses connected to said communication path, each viewer premises apparatus comprising:
means for receiving said television signal spectrum comprising said plurality of frequency separated channels conveying normal television signals and said at least one substitute television signal;
means for receiving said control signals;
means responsive to the address portion of said received control signals for deleting said specified frequency separated channel and for substituting said substitute television signal in place of the normal television signal conveyed by the frequency separated channel specified in said control signals; and means for distributing via a communication path within said viewer premises said plurality of normal television signals in which said substitute television signal has been substituted for the normal television signals of the specified frequency separated channel.

17. A television distribution system in accordance with claim 16 wherein said means for substituting comprises:

means for deleting said specified frequency separated channel from the television signal spectrum on said communication path;

means for frequency converting said substitute television signal substantially to the frequency of said frequency separated channel deleted by said deleting means; and means for combining said frequency converted substitute television signal with said television signal spectrum from which said specified frequency separated channel has been deleted.

18. A television distribution system in accordance with claim 16 wherein said means for deleting comprises means for frequency converting the entire spectrum of received television signals by an amount to substantially center said specified frequency separated channel at a predetermined frequency; and band rejection filter means having a bandwidth substantially centered at said predetermined frequency for filtering said specified frequency separated channel from said frequency converted spectrum.

19. A signal substitution system in accordance with claim 18 wherein said band rejection filter means has a bandwidth substantially equal to one television channel.

20. A television distribution system in accordance with claim 18 wherein said means for frequency converting said substitute television signal comprises means for receiving a representation of at least a portion of said television signal spectrum and means for substantially deleting all of said frequency separated channels of said spectrum representation except said substitute television signal.

21. A method of providing a plurality of television signals to television receivers in a viewer premises, said method comprising:

providing to a viewer premises, a transmission line conveying a television signal spectrum comprising a plurality of normal television signals and a substitute television signal in frequency separated channels;

connecting a channel substitution unit to said transmission line;

transmitting on said transmission line, control signals specifying the frequency separated channel of one of said normal television signals to be substituted with said substitute television signal;

receiving said control signals by said channel substitution unit;

creating a first and a second representation of said television signal spectrum;

substantially deleting in response to said control signals the specified frequency separated channel from said first representation of said television signal spectrum;

selecting said substituted television signal from said second representation of said television signal spectrum;

combining the television signals resulting from said deleting step and said selecting step to create a modified spectrum; and distributing said modified television signal spectrum on a signal distribution means within said viewer premises.

22. The method in accordance with claim 21 wherein said connecting step comprises connecting said channel substitution unit at a point in said transmission line near the entry thereof to said viewer premises.

23. The method of claim 21 in which said combining step comprises frequency converting the television signal resulting from said selecting step to the frequency of the frequency separated channel deleted by the deleting step.

24. A signal substitution system in accordance with claim 1 wherein said RF channel deletion apparatus comprises a tunable filter apparatus responsive to said received control signals for filtering said specified frequency separate channel from among said plurality of frequency separated channels.

* * * * *